(12) United States Patent
Belorustsev et al.

(10) Patent No.: US 11,318,679 B2
(45) Date of Patent: May 3, 2022

(54) 3D PRINTER PRINT HEAD SYSTEM WITH CURING MODULE ON ROTATION PLATFORM

(71) Applicant: Mighty Buildings, Inc., San Francisco, CA (US)

(72) Inventors: Sergei Belorustsev, Seversk (RU); Trushin Aleksandr Sergeevich, Tomsk (RU); Aleksei Dubov, Moscow (RU); Dmitrii Starodubtsev, Tomsk (RU); Slava Solonitsyn, Mountain View, CA (US)

(73) Assignee: Mighty Buildings, Inc., Oakland, CA (US)

( * ) Notice: Subject to any disclaimer, the term of this patent is extended or adjusted under 35 U.S.C. 154(b) by 299 days.

(21) Appl. No.: 16/452,354

(22) Filed: Jun. 25, 2019

(65) Prior Publication Data

US 2020/0406554 A1    Dec. 31, 2020

(51) Int. Cl.
  *B29C 64/393*    (2017.01)
  *B33Y 30/00*    (2015.01)
  (Continued)

(52) U.S. Cl.
  CPC .......... *B29C 64/393* (2017.08); *B29C 64/209* (2017.08); *B29C 64/241* (2017.08);
  (Continued)

(58) Field of Classification Search
  CPC ... B29C 64/264; B29C 64/277; B29C 64/282; B29C 64/209; B29C 64/241
  See application file for complete search history.

(56) References Cited

U.S. PATENT DOCUMENTS

| 6,543,890 B1 | 4/2003 | Ylitalo et al. |
| 8,778,252 B2 | 7/2014 | Mackie et al. |
| (Continued) | | |

FOREIGN PATENT DOCUMENTS

| CN | 105415687 B | 4/2018 |
| EP | 0915760 B1 | 5/2002 |
| (Continued) | | |

OTHER PUBLICATIONS

Translation of JP 2018-122454 ("Takai") (Year: 2018).*
International Search Report in International Application No. PCT/US2020/039519, dated Sep. 14, 2020.

*Primary Examiner* — Niki Bakhtiari
*Assistant Examiner* — John J DeRusso
(74) *Attorney, Agent, or Firm* — Cognition IP, P.C.; Edward Steakley

(57) ABSTRACT

A printing head of a printing system may include an extruder, a nozzle, a rotation platform, an engine with a drive mechanism, and at least one curing module. The printing head is found in fluid communication with a feeding system to receive a resin material to be extruded out of the nozzle. The rotation platform comprises a rotary system configured for rotation in at least one axis. The engine and drive mechanism drive the rotation of the rotation platform. The curing module is coupled to rotate with the rotation platform. The curing module is configured to assist in the curing of the extruded resin material. The curing module and the rotation platform are operatively connected to a control system for controlling operation of the curing module and the rotation platform.

20 Claims, 6 Drawing Sheets

(51) Int. Cl.
*B29C 64/277* (2017.01)
*B29C 64/209* (2017.01)
*B29C 64/241* (2017.01)
*B33Y 50/02* (2015.01)

(52) U.S. Cl.
CPC ............ *B29C 64/277* (2017.08); *B33Y 30/00* (2014.12); *B33Y 50/02* (2014.12)

(56) References Cited

U.S. PATENT DOCUMENTS

| | | | |
|---|---|---|---|
| 2015/0174824 A1 | 6/2015 | Gifford et al. | |
| 2015/0197062 A1 | 7/2015 | Shinar et al. | |
| 2016/0067920 A1* | 3/2016 | Fontaine | B29C 64/106 |
| | | | 264/255 |
| 2017/0066193 A1* | 3/2017 | Kim | B29C 64/118 |
| 2017/0072626 A1 | 3/2017 | McConville | |
| 2017/0197341 A1 | 7/2017 | Weinick et al. | |
| 2017/0246803 A1 | 8/2017 | Johnson | |
| 2018/0207863 A1* | 7/2018 | Porter | B29C 64/241 |
| 2018/0311898 A1 | 11/2018 | Schwarzbaum | |
| 2020/0306704 A1* | 10/2020 | Fakhouri | B01F 15/00168 |
| 2021/0078254 A1* | 3/2021 | Indyk | B29C 64/282 |

FOREIGN PATENT DOCUMENTS

| | | | | |
|---|---|---|---|---|
| JP | 2018-122454 A | 8/2018 | | |
| KR | 10-1679737 B1 | 11/2016 | | |
| WO | WO-2019023789 A1 * | 2/2019 | ............ | B33Y 40/00 |

* cited by examiner

3D PRINTER PRINT HEAD SYSTEM WITH CURING MODULE ON ROTATION PLATFORM

BACKGROUND

Three-dimensional (3D) printing, also known as additive manufacturing, is a technique that deposits materials only where needed, thus resulting in significantly less material wastage than traditional manufacturing techniques, which typically form parts by reducing or removing material from a bulk material. While the 3D printed articles were generally models, the industry is quickly advancing by creating 3D printed articles that may be functional parts in more complex systems, such as hinges, tools, structural elements.

In existing 3D printing processes, a 3D object is created by forming layers of material under computer control without molding. For example, 3D information of a structure is determined using computer 3D modeling fragmentation and a prepared mixture can be fed from a nozzle by mechanical control to print the structure.

One serious problem and challenge of 3D printing is that printing materials meeting requirements of certain applications can be very scarce. For example, existing printing materials are mainly organic materials. The organic materials are printed in a molten state at a high temperature via layer by layer deposition. Curing of the organic materials is prone to oxidation decomposition, and the preparation and printing processes may emit unpleasant toxic gases that harm the environment and human health. In addition, the organic materials may be printed under demanding conditions which incur high costs. Structures printed with the organic materials may have poor mechanical properties and are therefore not suitable for certain applications such as constructing livable buildings, thus limiting the application of 3D printing technology to a certain extent.

Another example of printing material is cement-based materials such as concrete. Cement-based materials generally take a long time to solidify. Thus, such materials generally cannot meet performance requirements requiring the material to rapidly solidify in a short period of time. Even though the speed of solidification can be increased by changing the formulation, such increase is usually limited or difficult to control and makes 3D printing impractical for certain circumstances such as constructing a building on a construction site.

In view of the foregoing, there is a need for improvements and/or alternative or additional solutions to improve 3D printing materials and processes.

BRIEF SUMMARY

The extruder may be in fluid communication with the feeding system. The nozzle may be in fluid communication with the extruder. The rotation platform may include at least one curing module and a rotary system providing power and control signals to at least one of the curing modules. The rotation platform may be configured for rotation in at least one axis. The rotation platform may also include an engine and an operative connection to a control system. The engine may be connected to the drive mechanism that operates the rotation platform.

In some configurations, the control system may include a curing module control system and a rotation platform control system.

In some configurations, the printing head may include an active feedback system for monitoring material curing and communicating information to the control system. In some configurations, the active feedback system may include sensors for measuring the thermal intensity of a material polymerization reaction. The active feedback system may also include sensors for measuring at least one of extruded material layer height, curing module temperature, curing module light intensity, and identifying formation of the extruded material layer. The active feedback system may also communicate with and control operations of the feeding system.

In some configurations, the curing module comprises at least two light emitting modules. In some configurations, the at least two light emitting modules are LED modules emitting Ultraviolet light.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
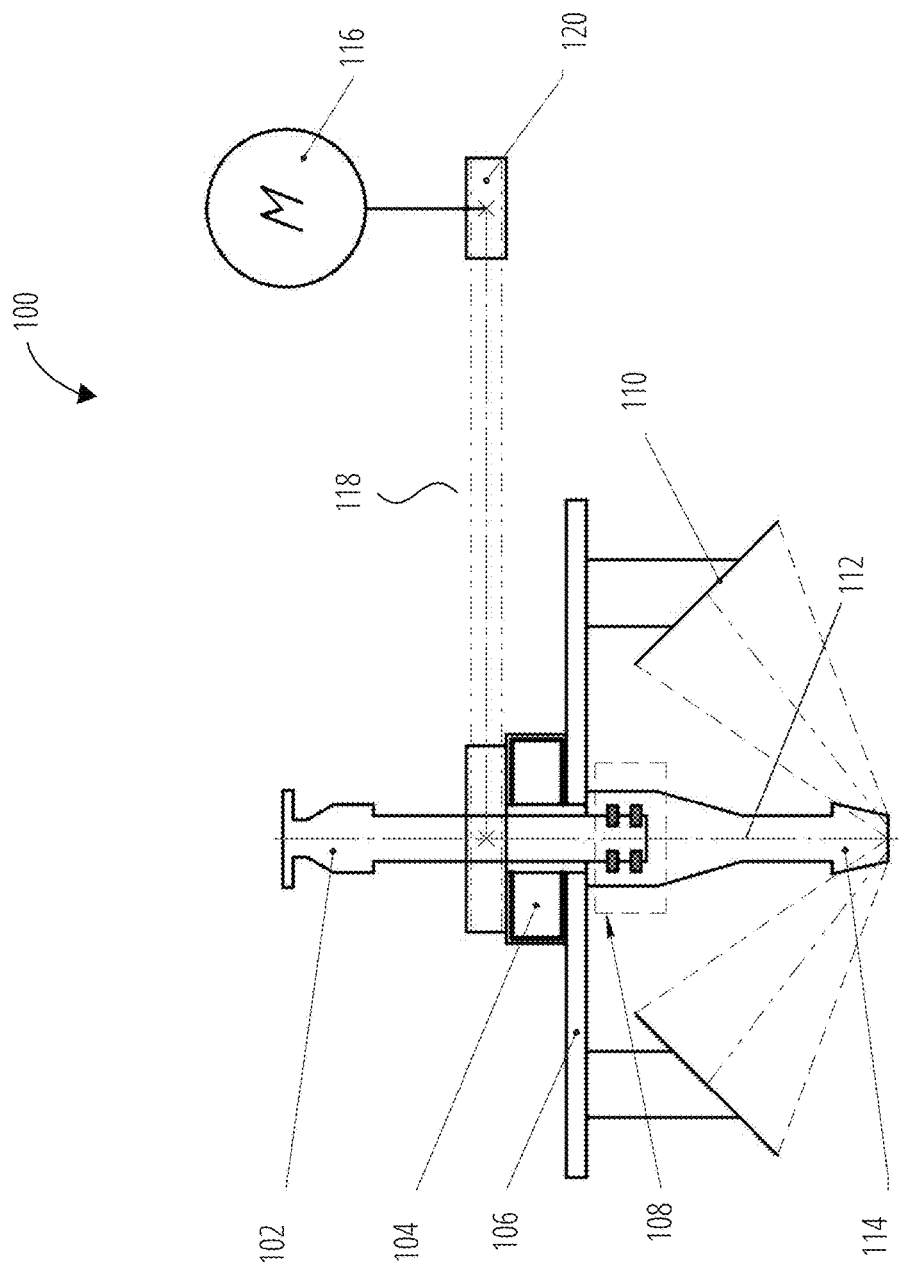
FIG. 1 illustrates a printing head 100 in accordance with one embodiment.

A printing head of a printing system may include an extruder, a nozzle, a rotation platform, an engine with a drive mechanism, and at least one curing module. The printing head is found in fluid communication with a feeding system to receive a resin material to be extruded out of the nozzle. The rotation platform comprises a rotary system configured for rotation in at least one axis. The engine and drive mechanism drive the rotation of the rotation platform. The curing module is coupled to rotate with the rotation platform. The curing module is configured to assist in the curing of the extruded resin material. The curing module and the rotation platform are operatively connected to a control system for controlling operation of the curing module and the rotation platform.

In some configuration, the printing head may include an active feedback system for monitoring material curing and communicating information to the control system. The active feedback system may be accomplished through sensors utilized for measuring the thermal intensity of a material polymerization reaction.

The printing system may include a feeding system comprising a material storage tank, a material feed hopper, and pumps for feeding material from the hoppers through the supply hoses to the printing head system. In some configurations, an active feedback system may communicate with and control operations of the feeding system. The active feedback system may communicate information regarding the progress of a print job to the feeding system that may be used to control the material flow rate.

In a material extrusion process, a printing material is fed by a material-feeding system through the deposition nozzle. The nozzle traverses via a positioning system to build up an object while an Ultraviolet (UV) optic system (curing module) cures the viscous material, forming a hard structure layer by layer. Operation of the UV optic system may be configured through the control system. The control system may monitor and control variables of the printing process that are translated from programming instructions loaded by a user. Key process variables, which may make up a print profile, may include material, nozzle diameter, print speed (a combined parameter made up of the feed rate of the material and the movement speed of the positioning system), curing module power usage, UV light intensity, rotation platform and curing module rotation and position, and layer thickness.

The control system may also control operation and movement of the printing head. The printing head moves along programmed line segments on the XY plane and extrudes a viscous printing material which is cured by irradiation from the UV optic system. The cured material hardens and adheres to the previous layer. After executing all of the commands for the current layer, the printer gantry moves upward by the height of one layer (ZY and ZX plane) and starts to print the next layer. A designed object may be formed by repeating this process for all of the layers. An example of the programmatic instruction utilized to control the printing head are found below.

G-Code
Sep S, 2018 at 11:40:43 AM
Settings Summary
; processName, top_1
; applyToModels, test_1.O
; profileName, Container
; profileVersion, 2018-06-26 11:29:58
; baseProfile, Default
; printMaterial, FS
; printOuality, Fast
; printExtruders,
; extruderName, extruder 1
; extruderDiameter, 20
; layerHeight, 4
; exportFileFormat, gcode
; defaultSpeed, 1800
; rapidXYspeed, 18000
; rapidZspeed, 3000
G90
M82
M106 5255
M104 SO TO
G28; home all axes
G1 Z4.000 F3000
process top_1
layer 1, Z=4.000
TO
; tool H4.000 W20.400
; external single extrusion
G1 X53.606 Y234.319 F18000
G92 E0
; tool H4.000 W20.823
G1 X57.672 Y233.605 E3.0405 F1800
; tool H4.000 W20.055
G1 X61.738 Y233.551 ES.9250

In some configurations, the printing head may be operatively coupled to a non gantry type printing system to position and orient the printing head in the formation of the printed component. For instance, the printing head may be operatively coupled to an articulating arm (e.g., spider, robotic arm, etc.,) that moves and positions the printing head within the three dimensional space of the printing area to form the extruded material layers of the printed component. In this configuration, the programmatic instructions may differ from the programmatic instructions utilized in the gantry system to account for the different range of motion provided by the different system.

In some configurations, the control signal may be communicated to the printing head through a wired communications method (e.g., ethernet, usb, fiber optic cable, etc.,). The wired communications method may be combined with the cables that deliver power to the LEDs of the curing module and power the movement of the rotation platform. In some configurations, the control system may utilize separate subsystems for controlling the curing module and the rotation platform. In this configuration, the control signal for the curing module and the rotation platform may be separate wired connections. The wired connection for the curing module may be combined in a wiring harness/assembly with the power cable for the curing module, while the wired connection for the rotation platform may be combined in a wiring harness/assembly with the power cable for the rotation platform.

In some configurations, the control signal may be communicated to the printing head through a wireless communications system. The utilization of the wireless communications system to communicate and receive the control signals between the printing head and the control system may eliminate the disadvantages associated with hard wiring such as weight reduction and the possibility of wires interfering with the printing process, extruded material layer, and etc.

In some configurations, the control system may operate the feeding system controlling operation of the pumps, agitators, air compressors, etc., utilized in the delivery of the polymer material to the printing head.

Figure 2:
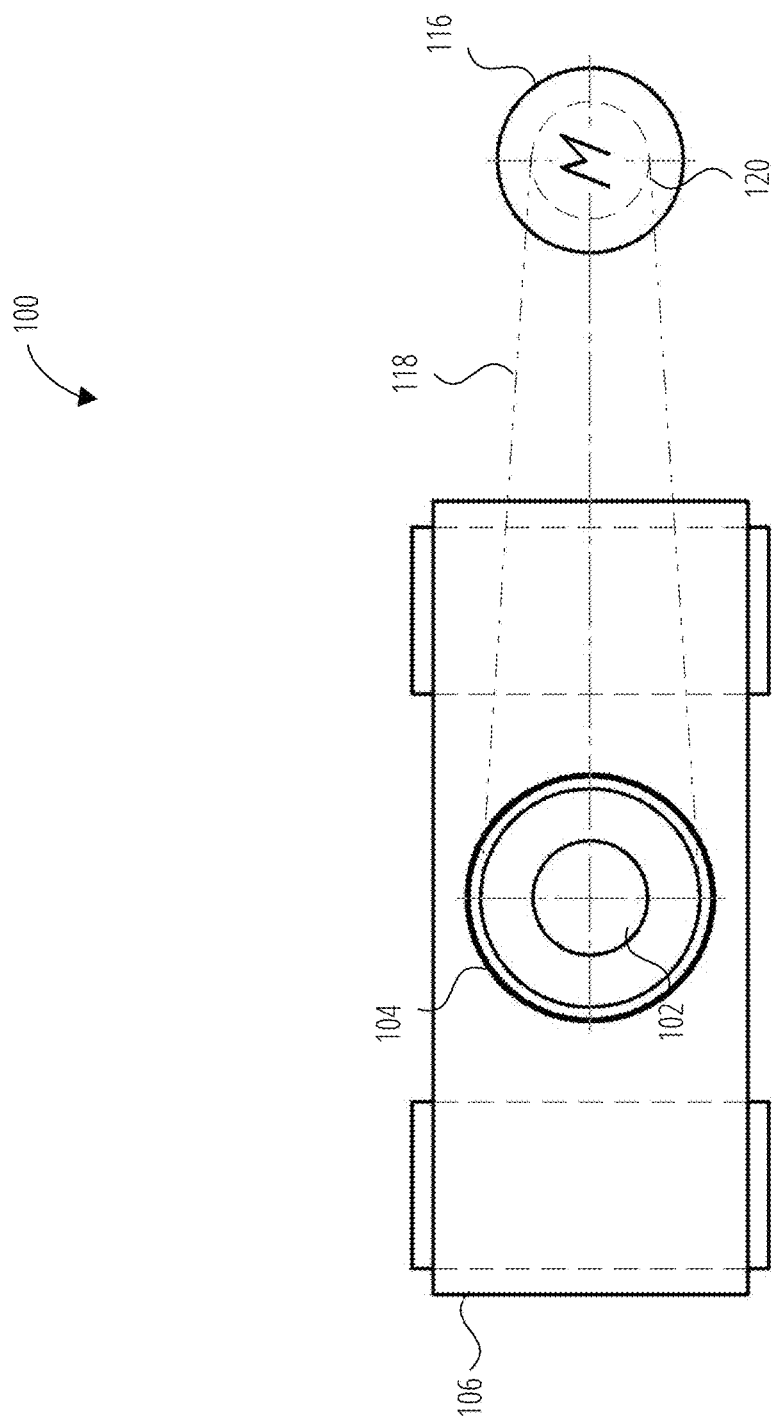
FIG. 2 illustrates a printing head 100 in accordance with one embodiment.
Figure 3:
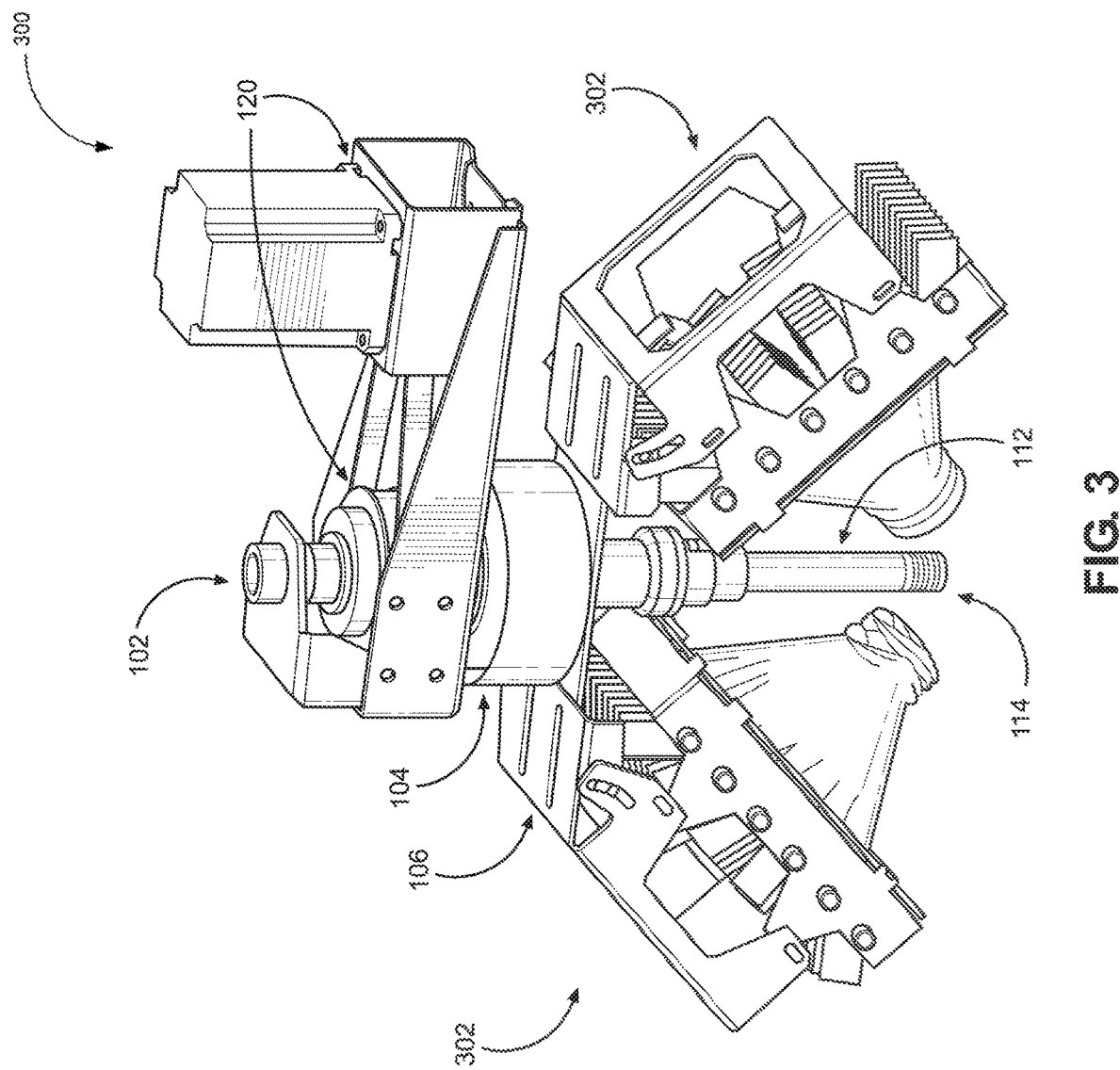
FIG. 3 illustrates a printing head 300 in accordance with one embodiment.

Referencing FIG. 1 through FIG. 3, a printing head 100 comprises a connector 102, a rotary system 104, a rotation platform 106, a seal unit 108, a curing module 110, an extruder 112, a nozzle 114, and an engine 116 and a belt drive 118 that operate as a drive mechanism 120.

The connector 102 is a node that provides a quick connection of the printing head and the feeding system.

The extruder 112 is part of the mechanism by which the composite resin flows from the feeding system to the extrusion nozzle 114. The nozzle 114 is a replaceable tool for extruding material into the printable area. It may be made of silicone blends. Depending on the printing mode, nozzle may be of a different configuration and geometry. The rotation platform 106 is a part of the mechanism to which all modules and parts rotating around the extruder 112 axis are attached. The engine 116 utilizes a belt drive 118 to operate as the drive mechanism 120. It may utilize a servomotor, a planetary gearbox, a toothed belt drive and electronic devices for controlling the motor driving rotation of the rotation platform. The rotary system 104 is an electrical module that provides power and control signals to rotating lighting modules when printing. The seal unit 108 is a unit for sealing between the stationary element of the extruder and the rotating one. It may prevent the composite resin from leaking. The curing module 110 or modules are mechanisms that assist in the curing of the extruded resin. In some configurations, the curing module 110 may improve reaction conditions associated with the curing of the extruded resin (e.g., irradiating, heating, drying, etc.).

In some configurations the curing module may comprise UV lighting modules 302.

In FIG. 3, the printing head 300 utilizes lighting modules 302 that serve as a source of UV radiation for the polymerization of the extruded material. Electronics allow for dynamically adjusting radiation power during the printing to ensure optimal modes.

The printing head 300 serves to feed material from a feeding system to the printable area with the required parameters of the layer to be extruded. It also provides optimal modes of UV radiation for the polymerization of the material in the field of printing. For this, some modules and mechanisms of the printing head rotate around the axis of the extruder-rotation platform, lighting modules, nozzle.

The printing head system comprises a device for extruding the material through an aperture of a predetermined shape and profile—the deposition nozzle, a mechanism for rotating the nozzle around the Z axis, and the UV optical system which is the source of ultraviolet light for curing the material.

Under the action of ultraviolet (UV) radiation, the initiator dissolved in the monomer begins the process of photopolymerization. The process of radical polymerization takes place resulting in the formation of a polymer matrix with filler inclusions. Because the polymer is branched and cross-linked, the polymer matrix is hard (and not elastic as rubber or polyethylene are). Adhesion between the layers occurs before the mass undergoes polymerization. Resin is deposited on the previous layer of the printed polymer and wets it. It is then polymerized under the influence of ultraviolet radiation.

The UV Optical System may include two or more UV lighting modules and a rotation mechanism, which are designed to expose the top and sides of the deposited material line with UV light. In an embodiment, each separate module emits a maximum of 110 Watts of light energy in a controllable manner from 0% to 100%. The UV light rays are mainly focused on a spot with a diameter of 20 mm, with some dissipated light around that spot gradually decreasing with increased distance from the center, down to zero at a diameter of 90 mm. Therefore, there may be zones of active curing just at the nozzle discharge point and secondary (stray) curing of lower layers.

Figure 4:
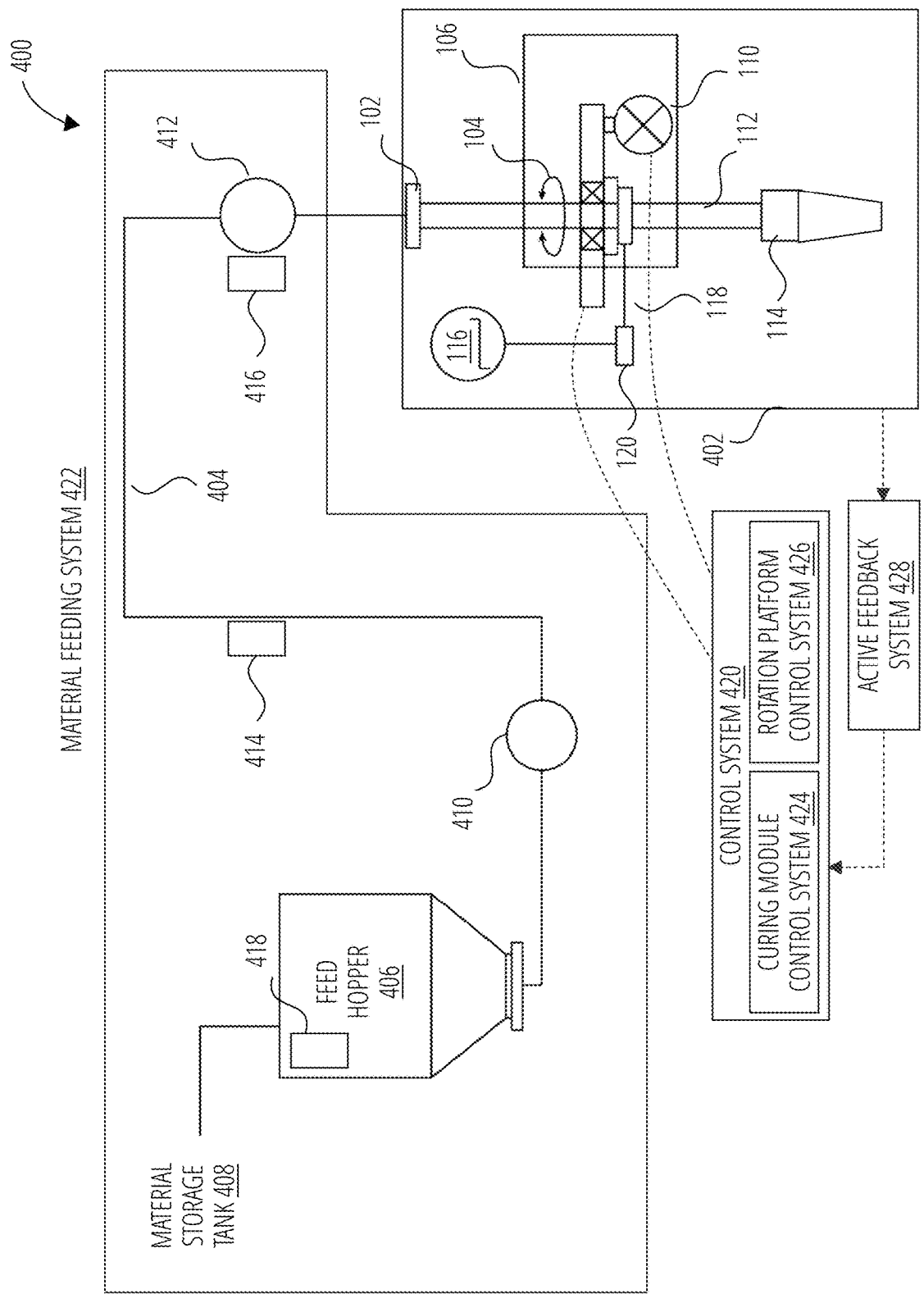
FIG. 4 illustrates a printing system 400 in accordance with one embodiment.

Referencing FIG. 4, a printing system 400 comprises a material feeding system 422, a printing head 402, and a control system 420. The material feeding system 422 comprises an input from a material storage tank 408, a material feed hopper 406, pumps for feeding material from the hopper (feeding pump 410 and feeding pump 412), and supply hoses 404 with auxiliary equipment (auxiliary equipment 418, auxiliary equipment 414, and auxiliary equipment 416) to assist the movement of the material to the printing head 402. The printing head system comprises a connector 102, a rotary system 104, a rotation platform 106, a seal unit 108 (not shown), a curing module 110, an extruder 112, a nozzle 114, and an engine 116 and a belt drive 118 that operate as a drive mechanism 120.

The control system 420 may be operatively connected to the curing module 110 allowing the control system 420 to control operation of the curing module 110. The control system 420 may be operatively connected to the rotation platform 106 allowing the control system 420 to control operation of the rotation platform 106.

In some configurations, the printing head includes an active feedback system 428 for monitoring material curing and communicating information to the control system 420.

In some configurations, the control system 420 may include control systems that control the curing module and the rotation platform independently, such as the curing module control system 424 and the rotation platform control system 426. In this configuration, the curing module control system 424 may control operation of the curing module such as the activation of the LEDs and the output intensity, while the rotation platform control system 426 may control operation of the rotation of the platform. The separation of the systems may facilitate maintenance and allow for the exchange or substitution of the modules for different printing jobs. For instance, the curing module may be replaced with its corresponding control system instead for a curing module and control system with different operational parameters better suited for the particular printing job. In this configuration, the active feedback system 428 may communicate information to the curing module control system 424 and the rotation platform control system 426.

Figure 5:
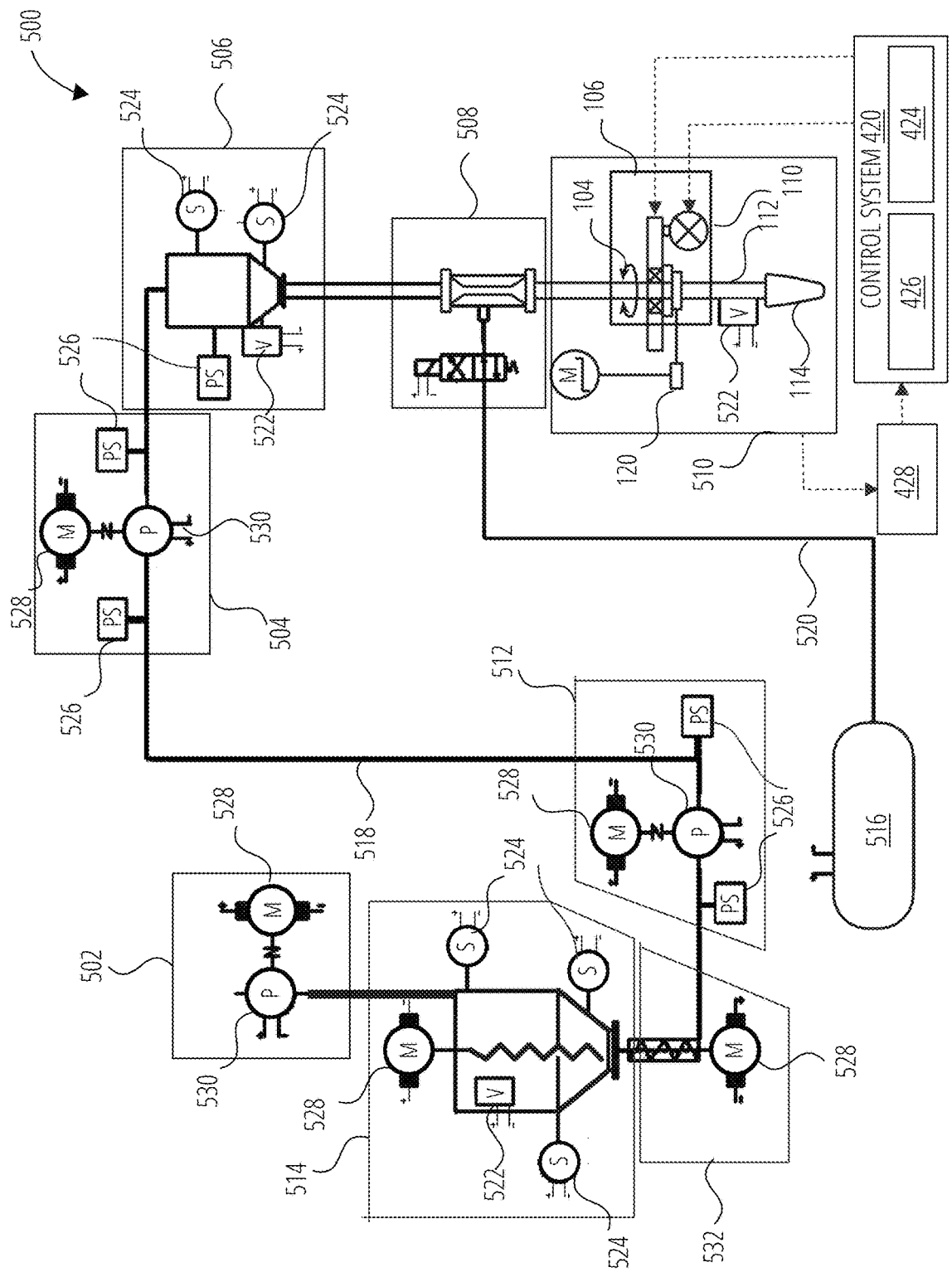
FIG. 5 illustrates a printing system 500 in accordance with one embodiment.

Referencing FIG. 5, a printing system 500 comprises a barrel pump 502, a main vessel 514, a feeding auger 532, a feeding pump 512, a dosing pump 504, an intermediate vessel 506, a shut off system 508, a printing head 510, and a control system 420.

The barrel pump 502 may be utilized for pumping the composite resin from storage and transportation tare (barrels) to the main vessel 514. In some configurations the barrel pump 502 may be a progressive cavity pump and may comprise a motor 528 and a pump 530.

The main vessel 514 serves as a container for the composite resin, with mechanisms that maintain liquid state and uniformity of the material and then discharge the material further into a material feed line 518. The main vessel 514 may be configured with a motor 528 for driving an agitator, vibrator 522, and at least one level sensor 524. The main vessel 514 may feed the material to a feeding auger 532.

The feeding auger 532 may be utilized to feed the material from the main vessel 514 into the material feed line 518 at a consistent rate.

The feeding pump 512 may include a pump 530, a motor 528, and at least one pressure sensor 526. The feeding pump 512 may be utilized for pumping the composite resin from the main vessel 514 to the dosing pump 504 in case of a long pipeline with high hydraulic resistance. In some configurations, a sequence of feeding pumps may also allow easy scaling of a length of a material feed line 518.

The dosing pump 504 may include a pump 530, a motor 528, and at least one pressure sensor 526. The dosing pump 504 may take the feed material and discharge it to the printing head 510 in a uniform and controlled manner with constant pressure and pre-set volume capacity. In some configurations, the dosing pump 504 may be a progressive cavity pump (eccentric screw pump).

The intermediate vessel 506 may include a vibrator 522, a pressure sensor 526, and at least one level sensor 524. The intermediate vessel 506 may be utilized for more uniform distribution of material in a material feed line 518 may also function as a material buffer. The intermediate vessel 506 may be utilized to prevent the desyncing of consecutively placed pumps that may create an excessive flow or, contrariwise, cavitation in addition to the use of the pressure sensor 526.

The shut off system 508 may utilize a shutoff valve for cutting off the material flow during pauses in the printing process (travel moves, printed surfaces machining, etc.). In some configurations, the shut off valve may be driven by an air compressor 516 and actuated by an electromagnetic valve on an air feed line 520.

The printing head 510 comprises the rotary system 104, the rotation platform 106, curing module 110, the extruder 112, the nozzle 114, and the drive mechanism 120. The curing module 110 and the rotary system 104 are operatively coupled to the control system 420.

In some configurations, the control system 420 may include control systems that control the curing module and the rotation platform independently, such as the curing module control system 424 and the rotation platform control system 426.

The vibrator 522 may be utilized for liquidizing (lowering the viscosity of) the resin in the pipeline and devices. The use of vibrators lowers the load on pumps and raises the possible length of the pipeline. In some configurations, the vibrator 522 may be attached to every pump and pipeline elbows.

The level sensor 524 may be utilized for monitoring of a level of the composite resin in vessels (the main vessel and any of intermediate vessel). That data may then be utilized by the control system 420 to control pumps and stored by the Data Storage System as an archive data.

The pressure sensor 526 may be utilized for monitoring of a level of pressure of the composite resin in the pipeline. That data then used by the automatic control system to control pumps and stored by the Data Storage System as a scientific data.

In some configurations, the active feedback system 428 acquires operational information through various input devices and communicates the information back to the control system 420.

TABLE 1

| Measurement Parameters | Sensor Qty. | Signal | Acquisition Method |
|---|---|---|---|
| Liquid Flow Rate | 1 | Digital | Flow Meter/Sensor |
| LED Module Power Delivery Measurements | 2 | Digital | Embedded Sensor on PCB |
| Frequency of Pump | 2 | Digital | Embedded Sensor in Pump |
| Extruded Polymer Temperature for Current and Previous Layers | 2 | Digital | Infrared Temperature Sensor |
| Emitted Light intensity | 2 | Digital | Spectrometers |
| Temperature of LED module | 2 | Digital | Temperature Sensing Device |
| Height of Current Layer | 1 | Digital | Optical Distance Sensor |
| Temperature of Printing Area | 12 | Digital | Temperature and Humidity Sensor |
| Temperature of Surrounding Environment Close to Printer | 1 | Digital | Temperature and Humidity Sensor |
| Humidity in Printing Area | 12 | Digital | Temperature and Humidity Sensor |
| Video Control of Printing Process | 1 | Digital stream | Camera |
| Thermal Imaging | 4 | Digital stream | Thermal Imaging Sensor |

Table 1 illustrates measurement parameters that may be collected by the active feedback system 428 as well as possible acquisition methods and quantity of sensor devices that the printing system may utilize. The printing system may utilize any liquid flow sensor to detect the liquid flow rate of the material through the feeding system. The printing system may monitor the power delivery to the LED modules through an embedded sensor on the printed circuit board (PCB) utilized by the LED modules by measuring the power received at the PCB to determine the power consumed before the LED drivers. The printing system may also measure the frequency of the pumps of the feeding system through embedded sensors in the pump for monitoring operation of the pumps.

The control system may also monitor the temperature of the extruded polymer for the current and previously printed layers through an infrared temperature sensor. The temperature readings for the current and previously printed material layers are utilized to determine the reaction rate of the polymerization reactions in the different layers that may indicate proper adhesion between the two material layers. For instance, if the temperature of the previous layers of the extruded polymer is below a certain temperature range, the polymerization reaction may have completed, limiting adhesion with the newer layer of material. Additionally, if the temperature of the extruded polymer in the current layer is lower than a certain temperature range following operation of the curing module, the current layer may not be fully reacting, which may result in the failed adhesion with the previous material layer. In some configurations, the Infrared Temperature Sensor may be a Raytek RAYCMLTVM.

The control system may also monitor the light intensity emitted by the LEDs of the curing module through a spectrometer. The readings from the spectrometer may be utilized as a calibration point for determining operation of the curing module. The control system may perform frequent checks on the intensity to ensure the proper operation and detect any failures in the curing module. In some configurations, the spectrometer may be a HAMAMATSU C10082MD (TM-UV/VIS-MOS) spectrometer.

The control system may also monitor the temperature of the LEDs of the curing module through a temperature sensor to ensure that the curing module is within safe operating parameters. In some configurations, the temperature sensor may be a TC74A0-5.0VAT serial EEPROM and temperature sensing device by Microchip Technology.

The control system may also monitor the height of the current layer of the extruded polymer to permit the application of the next layer or polymer by the printing head through operation of an optical distance sensor. In some configurations, the optical distance sensor may be a ODSL 9/V6-450-512—Optical distance sensor by Leuze electronics.

The control system may also monitor the temperature of the printing area, temperature of the surrounding environment close to the printer, and humidity in the printing area through a temperature and humidity sensor to determine if the printing environment is within adequate operational parameters. In some configurations, the control system may utilize a M12FTH3Q Temperature and Humidity Sensor from Banner Engineering.

The control system may also monitor video images of the printing process through a digital camera. The video image may be utilized to calculate the width of each layer. A digital camera utilized may capture images of the printing process at a rate of at least 60 fps. In addition to the digital camera, a laser may be utilized to project a line on the printed surface to allow software of the control system to calculate the width of the layers. In some configurations, the digital camera may be any digital camera with at least one megapixel resolution and a USB connection to the control system and the laser may be accomplished by a laser emitting diode visible by the digital camera.

The control system may also monitor thermographic images from a thermal imaging camera to determine the temperature of the printed component from all directions.

Figure 6:
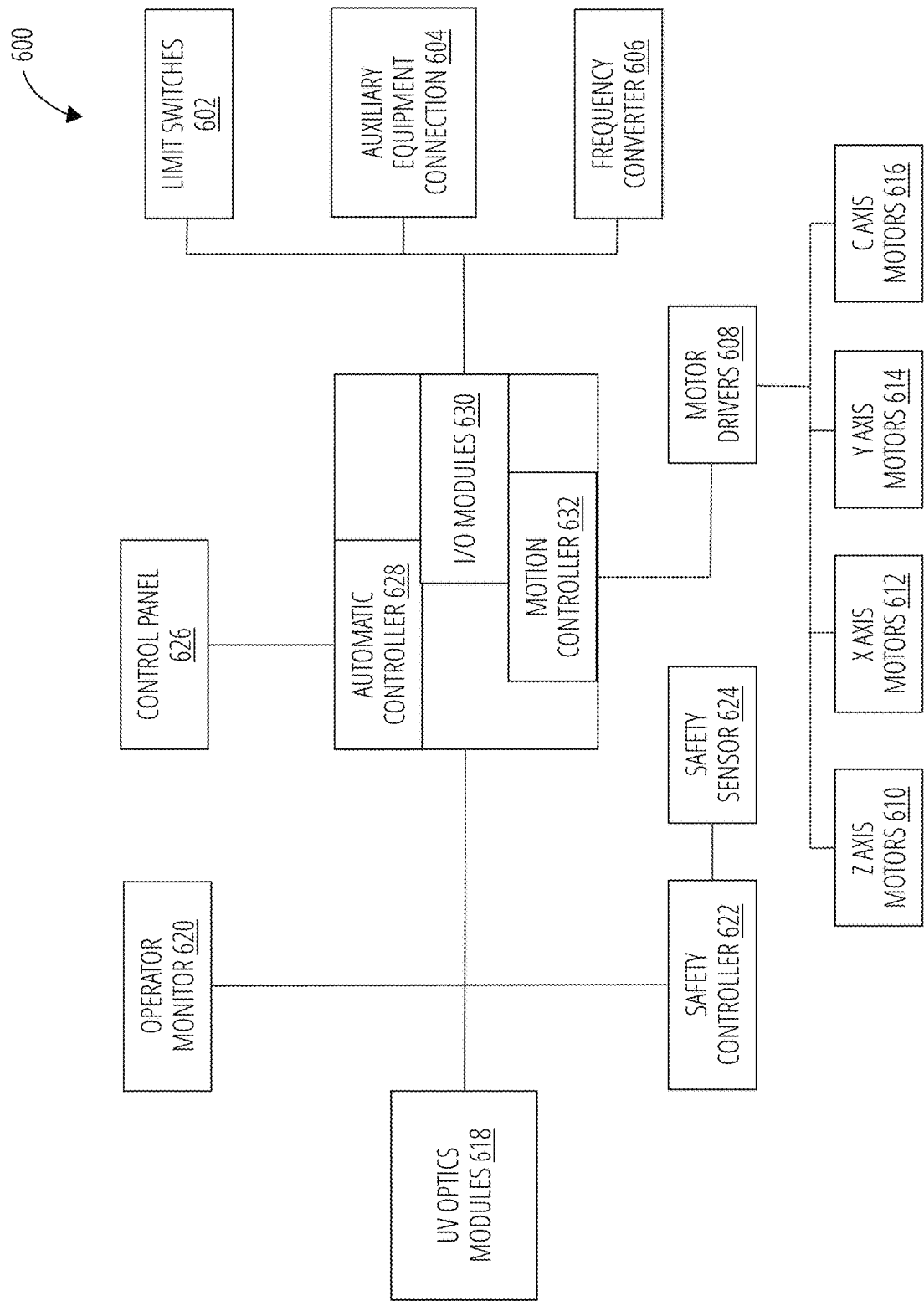
FIG. 6 illustrates a control system 600 in accordance with one embodiment.

Referencing FIG. 6, the control system 600 comprises an automatic controller 628 communicating with a control panel 626, a motion controller 632 communicating with motor drivers 608, and input/output modules 630 communicating with limit switches 602, an auxiliary equipment connection 604, and a frequency converter 606. The motor drivers 608 communicate with Z axis motors 610, X axis motors 612, and Y axis motors 614, for positioning the printing head within the printing area. The motor drivers 608 additionally control C axis motors 616 that control rotation of the rotation platform of the printing head around the extruder and nozzle. The control system 600 also communicates with an operator monitor 620 and a safety controller 622 that communicates with safety sensor 624.

The control system 600 additionally communicates with UV optics modules 618, controlling operation of the UV optics modules 618 for irradiating the poured resin for curing.

The control system 600 may include an electronics unit with software for manual and automatic modes of operation. The control system 600 may be operated to monitor and control operations of controlled systems such as the positioning system, material feeding system, printing head system, and auxiliary equipment (such as CNC milling/smoothing system). The control of the positioning system may be based upon the principles of Computer Numerical Control (CNC). Control of the material feeding system and printing head system may be based on the principles of automatic control and may utilize software algorithms to provide real-time monitoring and control of the processes. The auxiliary equipment controls may include safe operation sensors, emergency sensors and additional safety systems and equipment.

Human monitoring and control systems may provide function monitoring and manual control operation by the 3D printer operator. Communication interfaces provide data communication between the different devices and are also used for G-code program loading to the control system.

The positioning system may include a rigid frame assembled from an industrial grade aluminum profile rigidly fixed inside the freight container. The build platform is represented by the inner floor surface of the freight container. The 4-axis linear motion system may include linear guides, stepper motors with reduction gears, ball-screw pairs, a belt drive, and end position sensors.

The material feeding system may include input from a material storage tank, a material feed hopper, pumps for feeding material from the hopper, and supply hoses with auxiliary equipment that carry the material to the printing head system.

The printing head system may include a device for extruding the material through an aperture of a predetermined shape and profile—the deposition nozzle, a mechanism for rotating the nozzle around the Z axis, and the UV optical system, which is the source of ultraviolet light for curing the material.

The methods and formulations in this disclosure are described in the preceding on the basis of several preferred embodiments. Different aspects of different variants are considered to be described in combination with each other such that all combinations that upon reading by a skilled person in the field on the basis of this document may be regarded as being read within the concept of the invention. The preferred embodiments do not limit the extent of protection of this document.

Having thus described embodiments of the present invention of the present application in detail and by reference to illustrative embodiments thereof, it will be apparent that modifications and variations are possible without departing from the scope of the present invention.

What is claimed is:

1. A printing system configured to print an object in multiple layers, the printing system comprising:
   a control system;
   a feeding system supplying a viscous printing material to a printing head, the viscous printing material curable by ultraviolet irradiation;
   the printing head, in fluid communication with the feeding system, the printing head comprising:
      an extruder in fluid communication with the feeding system, the extruder comprising a first portion and a second portion, the first and second portions being interconnected by a seal, the first portion of the extruder being disposed through a rotation platform;
      a nozzle in fluid communication with the extruder;
      the rotation platform configured for rotation in at least one axis around the first portion of the extruder, wherein the rotation platform comprises:
         at least one curing module; and
         a rotary system providing power and control signals to the at least one curing module;
      an operative connection to the control system;
      an engine connected to a drive mechanism, wherein the drive mechanism operates the rotation platform to rotate around the first portion of the extruder, and
      an active feedback system configured to measure one or more parameters from one or more of the feeding system, the printing head, the object and the environment of the printing head and communicate the one or more measured parameters to the control system, wherein the control system is configured to control the printing head based on the one or more measured parameters received from the active feedback system.

2. The printing system of claim 1, wherein the control system further comprises:
   a curing module control system configured to control operations of the at least one curing module based on the one or more measured parameters received from the active feedback system; and
   a rotation platform control system configured to control operations of the rotation platform based on the one or more measured parameters received from the active feedback system.

3. The printing system of claim 1, wherein the active feedback system is configured to monitor material curing and communicate monitored curing information to the control system.

4. The printing system of claim 3, wherein the active feedback system comprises sensors configured to measure thermal intensity of a material polymerization reaction.

5. The printing system of claim 3, wherein the active feedback system comprises sensors configured to measure at least one of extruded material layer height, curing module temperature, and curing module light intensity, and the active feedback system is further configured to identify formation of an extruded material layer.

6. The printing system of claim 1, wherein the at least one curing module comprises at least two light emitting modules.

7. The printing system of claim 6, wherein the at least two light emitting modules are LED modules configured to emit Ultraviolet light.

8. The printing system of claim 1, wherein the control system comprises a replaceable curing control module, configured to control operations of the at least one curing module.

9. The printing system of claim 1, wherein the measured parameters comprise a flow rate of the feeding system.

10. The printing system of claim 1, further comprising an infrared temperature sensor, wherein the control system is configured to:
monitor a temperature of a currently printed layer and a previously printed layer; and
determine a reaction rate of a polymerization reaction in the printed layers.

11. A printing head, in fluid communication with a feeding system, the feeding system supplying a viscous printing material, curable by ultraviolet irradiation, to the printing head, the printing head comprising:
an extruder in fluid communication with the feeding system, the extruder comprising a first portion and a second portion, the first and second portions being interconnected by a seal, the first portion of the extruder being disposed through a rotation platform;
a nozzle in fluid communication with the extruder;
the rotation platform configured for rotation in at least one axis around the first portion of the extruder, wherein the rotation platform comprises:
at least one curing module; and
a rotary system providing power and control signals to the at least one curing module;
an engine connected to a drive mechanism, wherein the drive mechanism operates the rotation platform to rotate around the first portion of the extruder;
an operative connection to a control system; and
an active feedback system configured to measure one or more parameters from one or more of the feeding system, the printing head, and the environment of the printing head and communicate the one or more parameters to the control system,
wherein the control system is configured to control the printing head based on the one or more measured parameters received from the feedback system.

12. The printing head of claim 11, wherein the control system further comprises:
a curing module control system configured to control operations of the at least one curing module based on the one or more measured parameters received from the active feedback system; and
a rotation platform control system configured to control operations of the rotation platform based on the one or more measured parameters received from the active feedback system.

13. The printing head of claim 11, wherein the active feedback system is configured to monitor material curing and communicate monitored curing information to the control system.

14. The printing head of claim 13, wherein the active feedback system comprises sensors configured to measure thermal intensity of a material polymerization reaction.

15. The printing head of claim 13, wherein the active feedback system comprises sensors configured to measure at least one of an extruded material layer height, curing module temperature, and curing module light intensity, and the active feedback system is further configured to identify formation of an extruded material layer.

16. The printing head of claim 11, wherein the curing module comprises at least two light emitting modules.

17. The printing head of claim 16, wherein the at least two light emitting modules are LED modules configured to emit Ultraviolet light.

18. The printing head of claim 11, wherein the control system comprises a replaceable curing control module, configured to control operations of the at least one curing module.

19. The printing head of claim 11, wherein the measured parameters comprise a flow rate of the feeding system.

20. The printing head of claim 11, further comprising an infrared temperature sensor, wherein the control system is configured to:
monitor a temperature of a currently printed layer and a previously printed layer; and
determine a reaction rate of a polymerization reaction in the printed layers.

* * * * *